United States Patent [19]
Yun

[11] Patent Number: 5,826,840
[45] Date of Patent: Oct. 27, 1998

[54] COMPUTER KEYBOARD SUPPORT

[76] Inventor: Je-Ho Yun, 481-7, Beom-eo 3-dung, Suseon-gu Taegu, Rep. of Korea

[21] Appl. No.: 711,245

[22] Filed: Sep. 9, 1996

[30] Foreign Application Priority Data

Sep. 7, 1995 [KR] Rep. of Korea .................. 1995-24496
Jan. 25, 1996 [KR] Rep. of Korea .................... 1996-1150

[51] Int. Cl.⁶ ..................................................... B68G 5/00
[52] U.S. Cl. ........................................... 248/118; 248/918
[58] Field of Search ................................ 248/118, 118.1, 248/118.3, 118.5, 918; 400/715

[56] References Cited

U.S. PATENT DOCUMENTS 5,341,929 8/1994 Stenfancin, Jr. ................. 248/442.2 X
5,374,018 12/1994 Daneshvar ............................... 248/118
5,549,268 8/1996 Hopwood ............................. 248/442.2
5,628,482 5/1997 Iravantchi et al. ...................... 248/118

*Primary Examiner*—Ramon O. Ramirez

[57] ABSTRACT

This invention concerns a computer keyboard support which is mainly installed on computer keyboards to offer more convenient use of a computer, and which improves work efficiency. The computer keyboard support includes a main body designed to assemble with a keyboard, a hand rest and a catch installed at the front and back of the main body, respectively, and a paper holder board installed into the catch so that the paper holder board can freely turn. The paper holder board is designed to move to the left or right with the catch, and the main body is designed to enable its width to be adjusted.

20 Claims, 8 Drawing Sheets

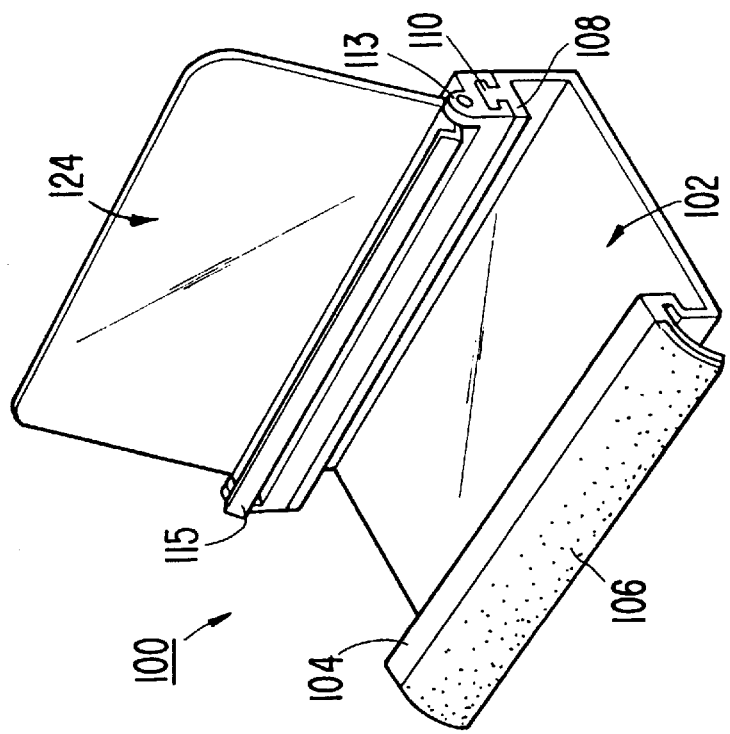
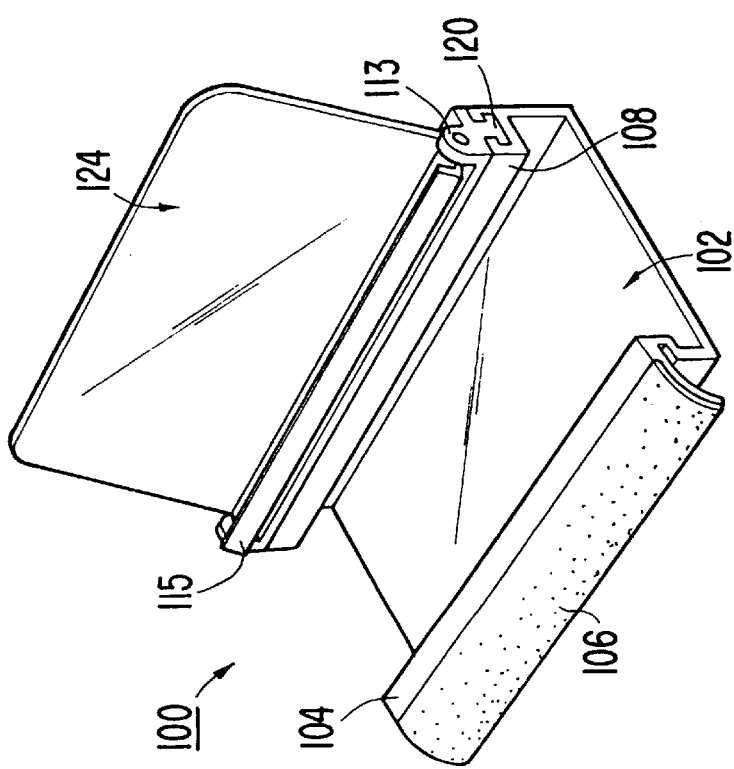

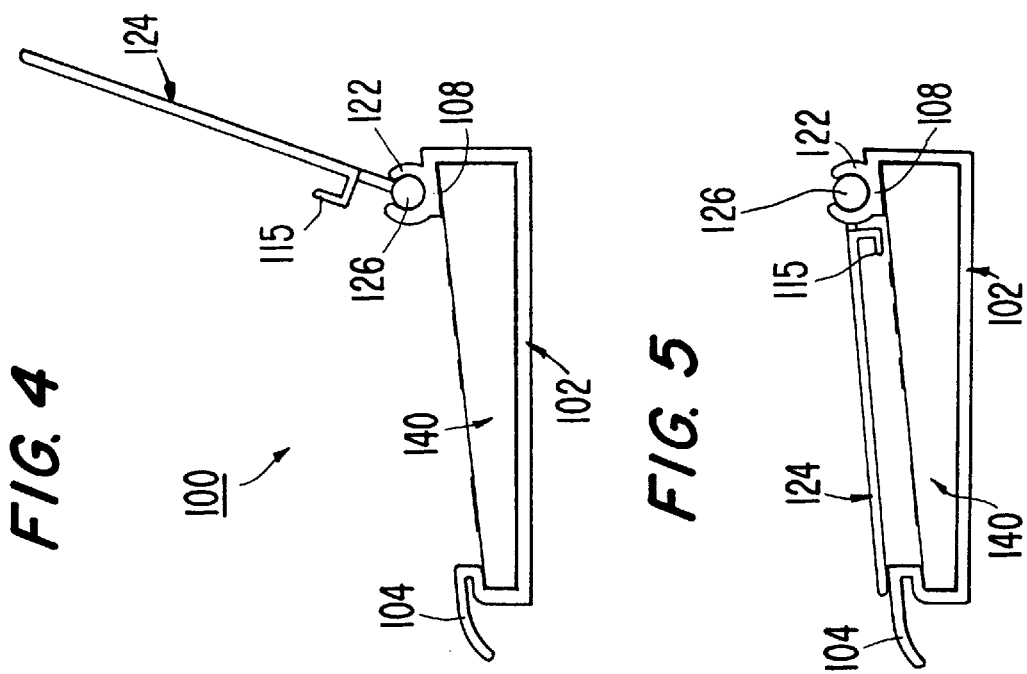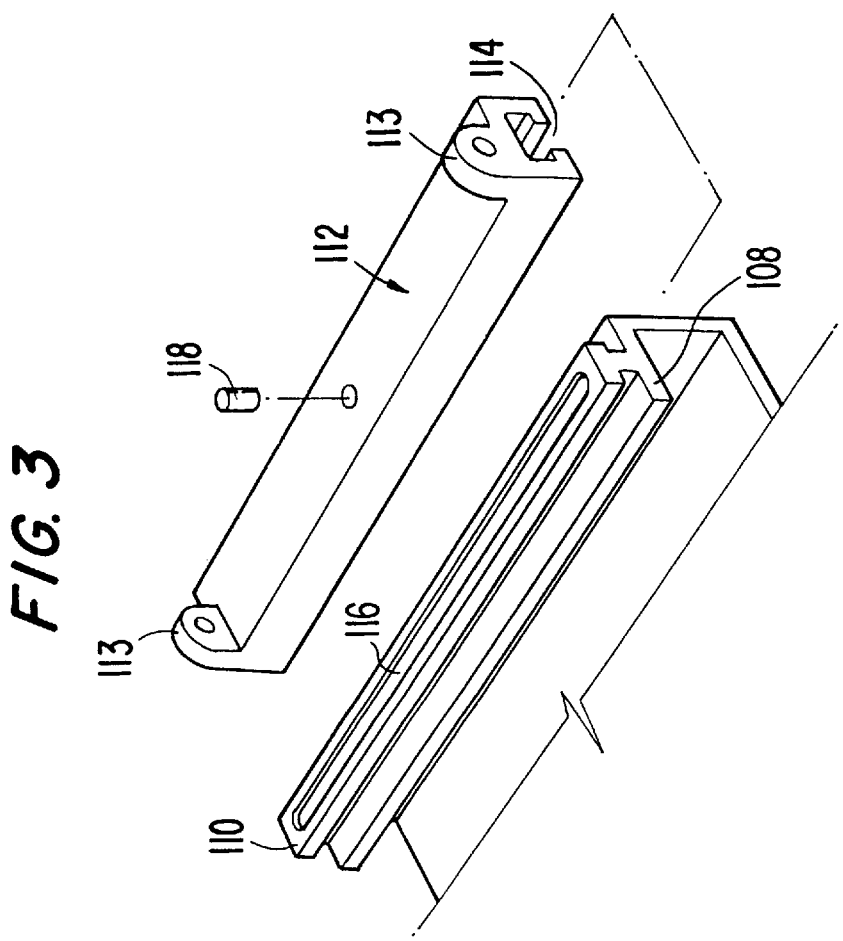

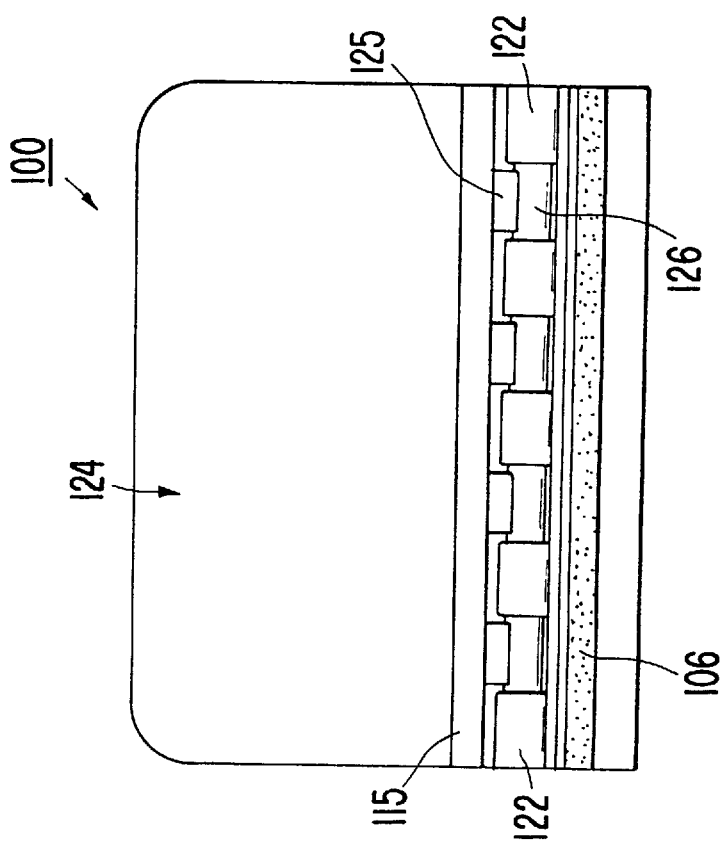
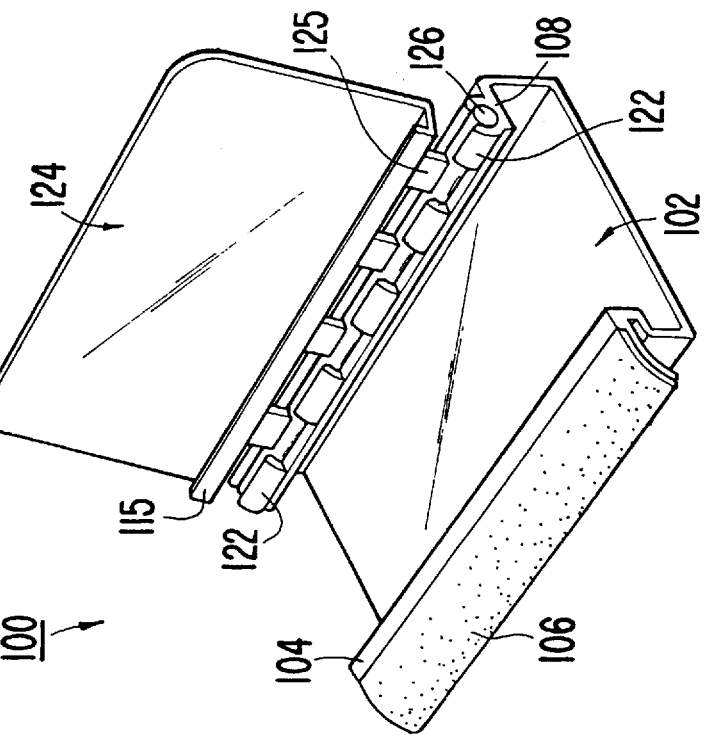

FIG. 8
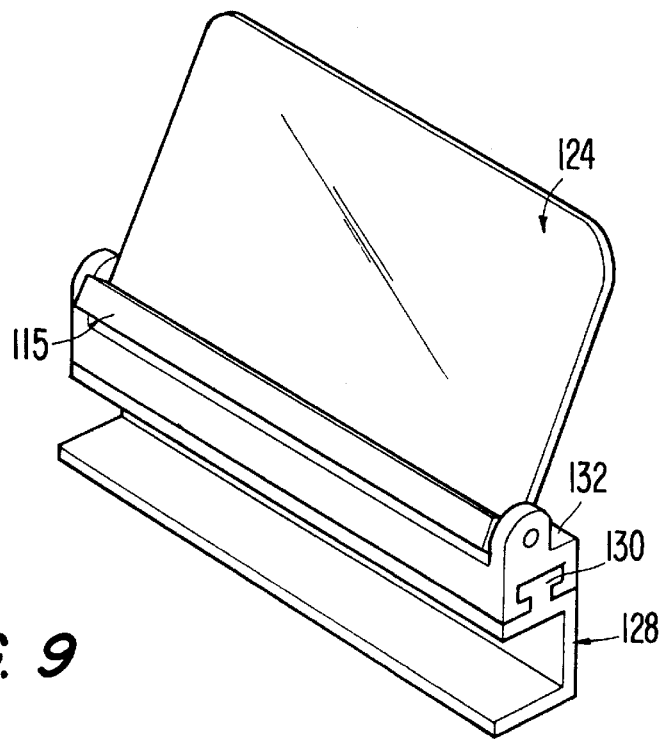
FIG. 9
FIG. 10
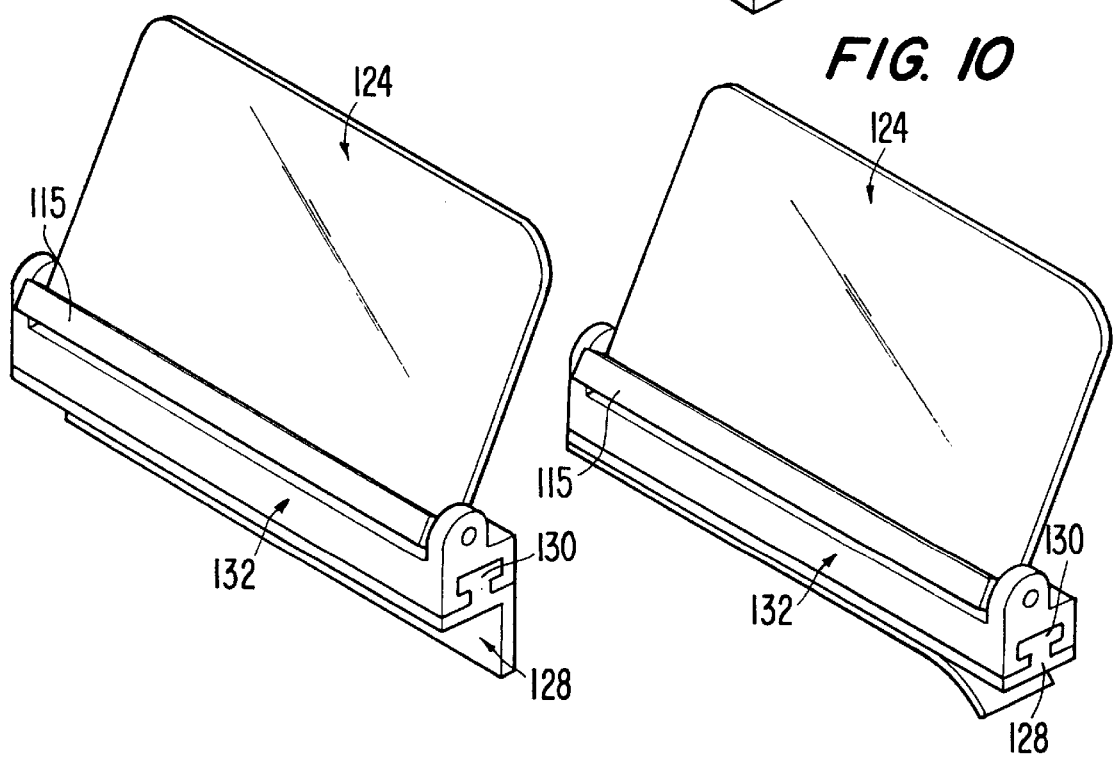

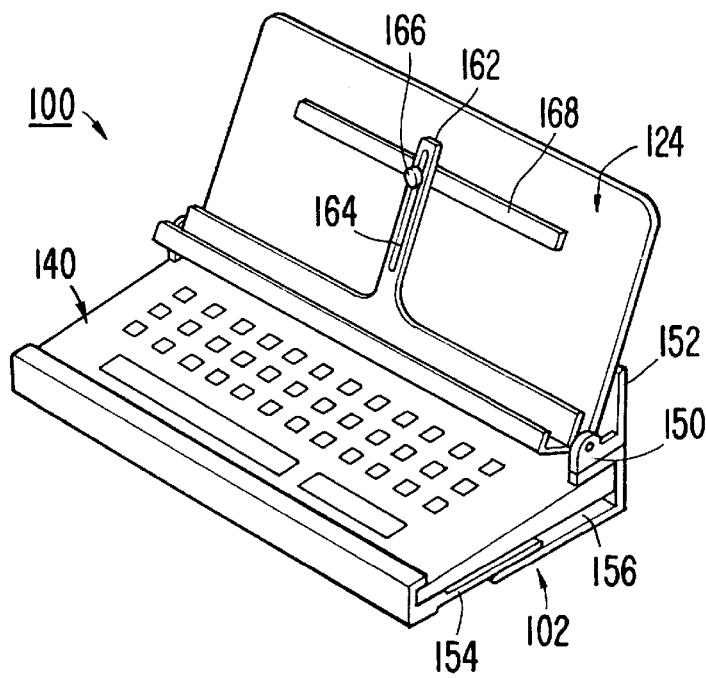
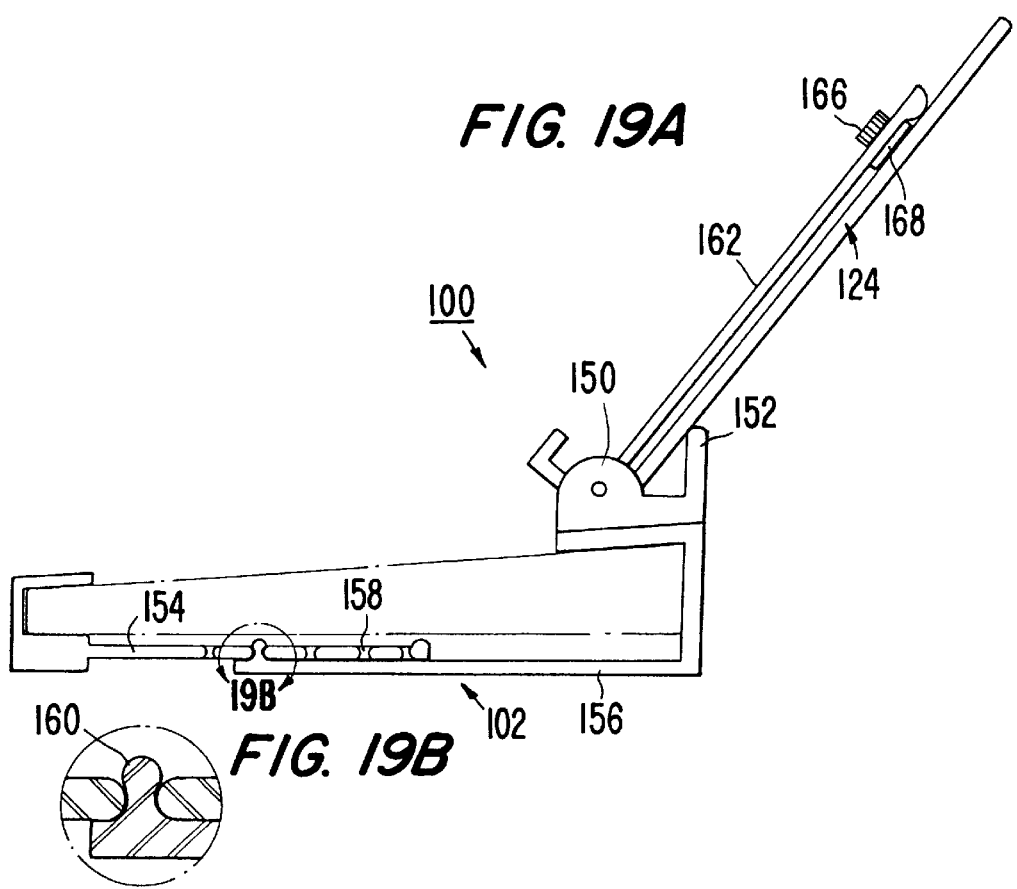

COMPUTER KEYBOARD SUPPORT

This invention relates to a computer keyboard support, and more particularly to a computer keyboard support which is mainly installed on computer keyboards to offer more convenient computer work and improved work efficiency.

BACKGROUND OF THE INVENTION

In general, to load data of documents and/or manuscripts into a computer, the documents or manuscripts are placed in an appropriate place on the desk where the computers and keyboard are, and the operator performs computer operations while looking at the documents/manuscripts. However, such process of working has the following demerits.

Because the manuscripts are placed on the left or right side of the keyboard and monitor of computers, operators have to move their eyes often during the computer work, causing eye strains easily. This makes the use of computer inconvenient and causes the work efficiency to deteriorate.

SUMMARY OF THE INVENTION

It is an object of the present invention to correct such existing disadvantages. In the present invention, as the manuscripts are placed directly above the computer keyboard, eye strain is reduced, working becomes more convenient and work efficiency is improved.

To satisfactorily achieve the above object, the device according to the present invention allows the paper holder board, installed directly to the upper side of keyboard, to move freely towards the front and back so that operator can see manuscripts in the most suitable direction and angle and, upon completion of work, the operator can pull the paper holder board to cover and protect the keyboard.

From above, it is ideal to make the paper holder board installed at the back of the support to move to the left or right and, at the front, a hand rest is installed so that operator can rest hands comfortably to ensure comfort and more efficient working environment.

To fix the paper board support which holds the paper holder board turning freely on the keyboard, brackets can be installed on the left and right side of the keyboard, connecting the paper board support with shaft-pins.

In addition, another example of an operation of a keyboard support according to the present invention includes the paper holder board having the keyboard support, which is made to turn freely and move to the left or right. Because the keyboard support described above has a fixed size of body, the keyboard used is also limited.

Accordingly, to use the keyboard support more flexibly in installing on keyboards, the keyboard support may be constructed in

type which is equipped with the rear catch with the front catch installed, or in

type so that the keyboard support can be used regardless of types or sizes of keyboards.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein:

FIG. 1 is a perspective view of a keyboard support according to the present invention;

FIG. 2 is a perspective view of the keyboard support;

FIG. 3 is a perspective view showing the carriage of the keyboard support, disassembled from the catch;

FIG. 4 is a side view of the keyboard support shown in FIG. 3 in operation;

FIG. 5 is a side view of the keyboard support shown in FIG. 3, where the paper holder board is turned towards the front to cover the keyboard;

FIG. 6 is a perspective view of the keyboard support according to another embodiment of the present invention;

FIG. 7 is a front view of the keyboard support shown in FIG. 6;

FIGS. 8–10 are perspective views of the keyboard support according to the present invention;

FIG. 18 shows a perspective view of the keyboard support according to another embodiment of the present invention; and FIGS. 19A & 19B, hereinafter referred to as FIG. 19, are side views of the keyboard support shown in FIG. 18.

DETAILED DESCRIPTION OF THE PREFERRED EMBODIMENTS

Figure 11:
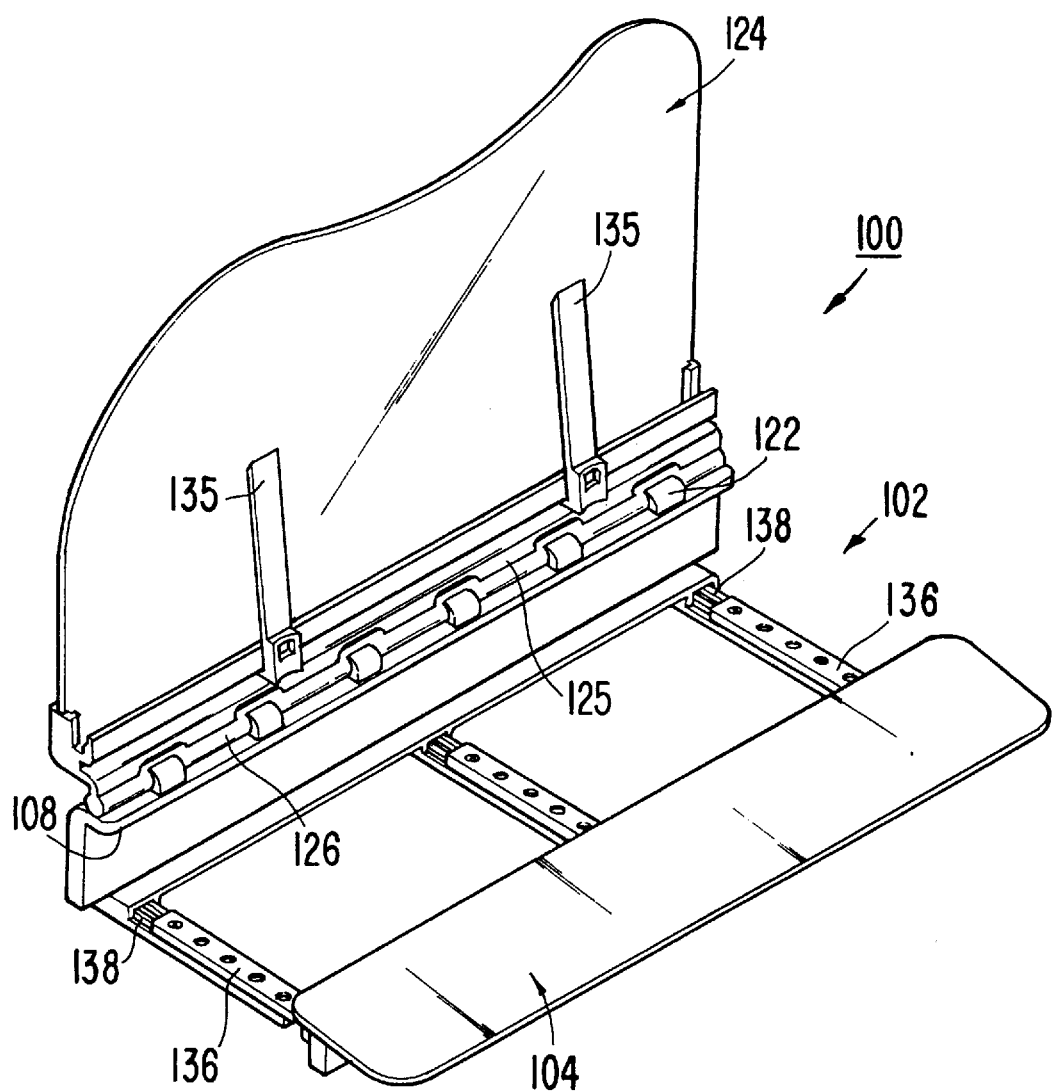
FIG. 11 shows a perspective view of the keyboard support according to another embodiment of the present invention.

Detailed descriptions of this invention are provided as follows according to the attached drawings.

FIGS. 1–5 show perspective views of the keyboard support according to the present invention and the detailed structure thereof is as follows.

At the front of the main body 102 of the keyboard support 100, a hand rest 104 which has been slightly curved towards the front is installed, and on top of this hand rest 104, a piece of synthetic resin plate 106 is attached and fixed to allow computer operators to rest hands comfortably while working.

At the rear of the main body 102, a catch 108 is installed which has been rounded, and on top of this catch 108, a crosswise long guide 110 is attached as shown in FIG. 3. On the guide 110, the guide groove 114 of the carriage 112 is inserted so that the carriage 112 can move to the right or left according to the guide 110.

On the guide 110, there is a carriage groove 116 installed. As shown in FIG. 3, a catch bar 118 inserted into the carriage 112 is fitted into this carriage groove 116. This allows the carriage 112 to move to the left or right, and if the carriage moves a specific distance, the catch bar 118 makes contact with the end of the carriage groove 116, barring the carriage from moving any more.

On both the left and right sides of the above carriage 112, catch 113 is installed into which the paper holder board equipped with the paper holder seat 115 is inserted for free turning.

As for the construction of the keyboard support as shown in FIG. 1, the carriage groove is formed on top of the catch 108, and the carriage 112 is equipped with the guide 120 which is inserted into the guide groove to facilitate the left or right movement of the carriage.

FIG. 6 shows an example of the keyboard support 100 according to another embodiment of the present invention. On top of the catch 108 installed at the rear of the main body 102, a number of round paper holder connectors 122 are installed, and the guide bar 126 installed in front of the paper holder board 124 is inserted into the above paper holder connectors so that the paper holder board can be moved to the left or right.

In addition, as shown in FIGS. 8, 9, and 10, the keyboard support can be constructed, without assembly main body, in ""

type,

""

type and "_" type by using the catch 128 alone, which is assembled or bonded/fixed to the rear of keyboard. After this, the guide groove of the carriage 132 is inserted into the guide 130 constructed on the catch 128 so that the paper holder board 124 can move to the left or right.

Furthermore, in the paper holder board moving system and hand rest, the components of the keyboard support described above can be constructed into one body to the rear and front of the keyboard respectively when manufacturing the keyboard, and the effects are same.

FIG. 11 shows a construction of the keyboard support 100 according to another embodiment of the present invention. A pair of paper holders 135, movable to the left or right, are installed on the paper holder seat constructed in the front of the paper holder board 124, and the above-stated paper holders 135 are used to fix input materials (manuscripts) placed on the paper holder board 124.

In addition, the main body 102 can be constructed in 2 sections, front and back. By using the front and back adjusting plates 136, 138 constructed on the main body 102, the size of main body 102 can be adjusted to flexibly accommodate keyboards regardless of their type and size.

Figure 12:
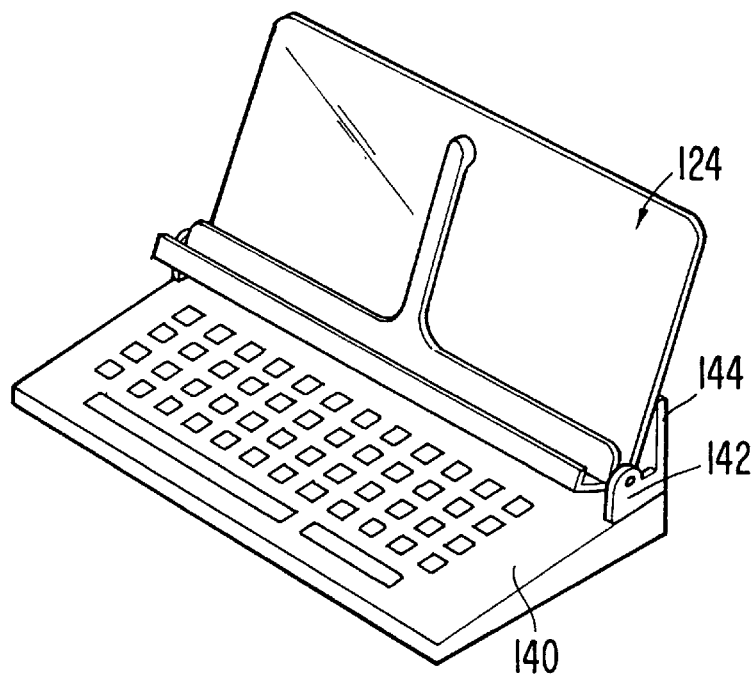
FIG. 12 shows a perspective view of the keyboard support according to another embodiment of the present invention, where the keyboard support is assembled with the keyboard.
Figure 13:
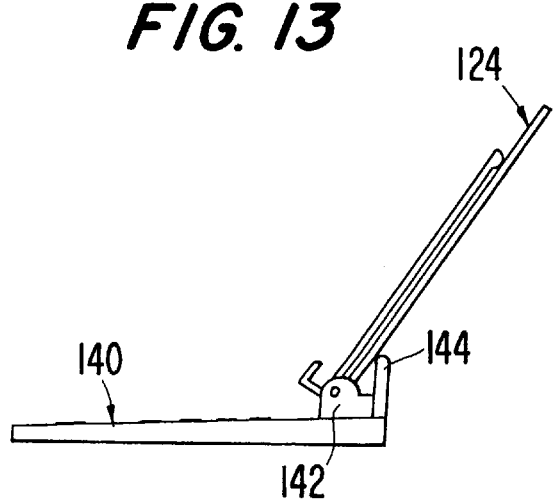
FIG. 13 is a side view of the keyboard support shown in FIG. 12.
Figure 14:
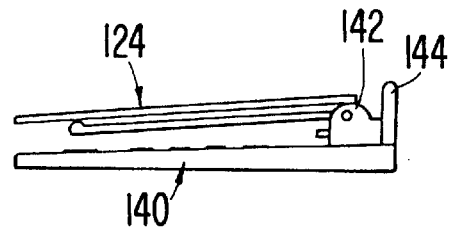
FIG. 14 is side view of the keyboard support shown in FIG. 12, showing the paper holder board covering the keyboard.

Also, as shown in FIGS. 12–14, the keyboard support of the present invention can be manufactured into a single body with the computer keyboard 140.

In other words, brackets 142 are installed on both sides of the keyboard 140 and the paper holder board 124 is installed on the above brackets 142 using shaft pins to allow the board 124 to freely turn. To the back of brackets 142, a specific height of paper board supports 144 are installed so that the paper board supply can support the paper holder board 124 from behind to prevent the paper holder board from tilting towards and to ensure the paper holder board to maintain a uniform angle at all times.

Figure 15:
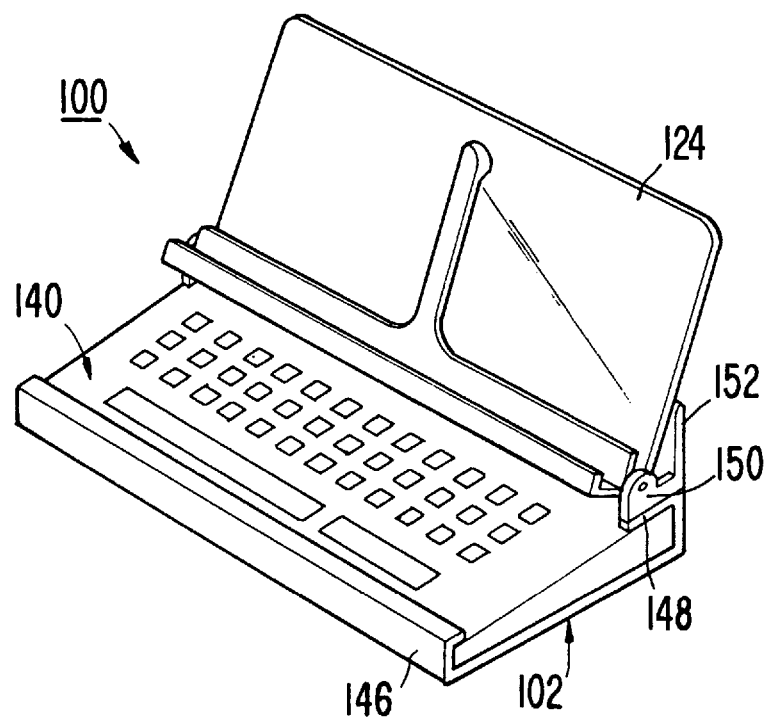
FIG. 15 shows a perspective view of the keyboard support according to another embodiment of the present invention.
Figure 16:
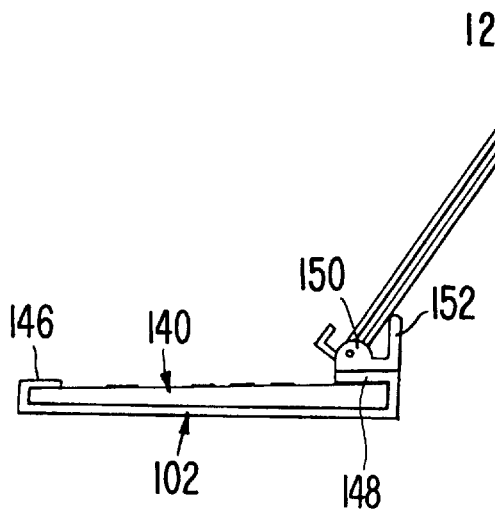
FIG. 16 shows a side view of the keyboard support shown in FIG. 15.
Figure 17:
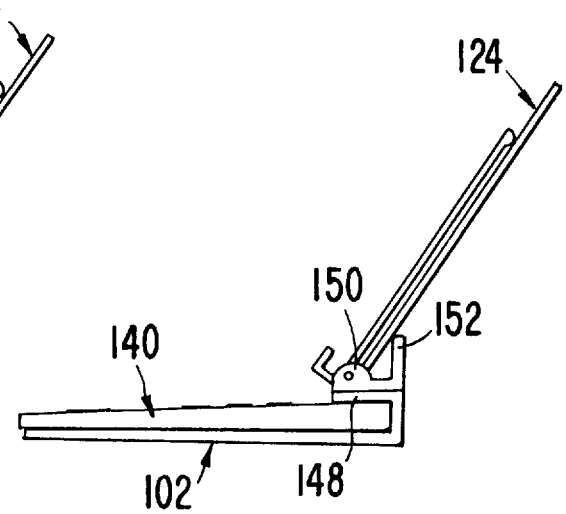
FIG. 17 shows a side view of the keyboard support shown in FIG. 15 with the front catch removed.

FIGS. 15–17 show perspective views of the keyboard support 100 according to another embodiment of the present invention. As a means to fix the paper holder board 124, ""

type main body 102 equipped with front and back catch 146, 148 is injected molded, and brackets 150 are installed on the left and right sides of the back catch 148, allowing the paper holder board 124 to turn on the above brackets 150. At this time, at the back of bracket 150, the paper board support 152 is installed to ensure that the paper holder board 124 maintain a uniform angle.

Also, as shown in FIG. 17, the main body 102 may be constructed in

""

type which when construction support plate, is equipped with only back catch 148 without the front catch.

FIG. 18 shows another construction of the keyboard support according to the present invention. To flexibly use the keyboard support irrespective of the size of keyboard 140, the main body 102 may be constructed in such a structure which allows adjustment of ""

type equipped with only the front part of the main body 154, or

""

type equipped with only the back part of main body 156, so that the keyboard support can be used irrespective of types or sizes of keyboard.

This means that as shown in FIG. 19, a number of assembling holes 158 are installed at same intervals on the front part of the main body 154, and assembling bars 160 are installed on the back part of the main body 156 which assembles to the front part of the keyboard support, and depending on the position where the assembling bars 160 are inserted into the assembling holes 158, keyboards 140 of the different sizes and types can be used. In addition, brackets 150 and paper board supports 152 are installed on the back part of the main body 156 described above, and the freely-turning paper holder board 124 is installed on brackets 150. At this time, a long hole 164 is punctured on the paper holder 162 installed in front of the paper holder 124, and a cross bar 168 the height of which is controlled by the operation (loosening and tightening and movement) of the adjuster 166 on the long hole described above is installed.

Based on this invention constructed as above, manuscripts the data of which are to be loaded into the computer can be placed on the paper holder board 124 installed at the back of the keyboard 140 to ensure convenient computer operation. Upon completion of computer work, the paper holder board 124 can be pulled forwards to protect the keyboard 140, as shown in FIG. 5.

In addition, the keyboard support according to the present invention is constructed in such a way that, after the paper holder board 124 is assembled to the back of main body 102, the carriage 112 moves to the left or right according to the guide 110 and as needs arise, the position of the paper holder board 124 can be freely adjusted to ensure more convenient use. Furthermore, a hand rest 104 composed of synthetic resin plate 106 is installed in front of the keyboard support 100 to allow computer operators to rest hands on the hand rest 104 so that the operators can work in a more comfortable posture and to improve work efficiency.

At this time, the keyboard support constructed as shown in FIGS. 8–10 can be assembled to the keyboard 140 main body, or use adhesive to fix for convenient use, and a separate hand rest may be installed at this time at the front of the keyboard 140.

Also, the hand rest or the movable support can be manufactured into a single body with the keyboard, and the operating effects are the same.

In addition, as shown in FIG. 6, the paper holder board 124 is installed on the keyboard support 100 in such a way as to allow the paper holder board 124 to move, the round paper holder connectors 122 are installed on the catch 108 the guide bar 126 installed at the bottom of the paper holder board is assembled to the above-said paper holder connectors 122. To move the paper holder board 124 to the left or right at this time, the paper holder board can be moved to the left or right in standing position to adjust positions, and if it is desired to cover the keyboard 140 by pulling the paper holder board 124 towards the front, the connector 125 which corrects the paper holder board 124 is inserted to the guide bar 126 into the space between the paper holder connectors 122, and the paper holder board 124 is pulled towards the front. Then as shown in FIG. 5, the paper holder board is turned forward, covering the keyboard.

According the embodiments of the present invention, the keyboard support can be constructed as a system which can be assembled to the computer keyboard, or which can be manufactured as part of the keyboard so that documents or manuscripts can be placed at the back of the keyboard, offering convenient work and improved work efficiency. The freely turning paper holder board 124 is installed at the back of the main body 102, and as the paper holder 124 can be moved to the left or right, position of the paper holder board 124 can be adjusted according to each needs and use.

The hand rest 104 installed at the front of the main body 102 enables operators to carry out computer work more conveniently and to improve work efficiency significantly.

What is claimed is:

1. A computer keyboard support comprising:
   a main body;
   a hand rest installed at a front of the main body;
   a catch installed at a back of the main body and having a guide formed thereon;
   a carriage cooperating with the guide of the catch; and
   a paper holder board cooperating with the catch, so that the paper holder board can turn freely and move to the left or right in a horizontal direction.

2. A computer keyboard support of claim 1, wherein the main body has a C-configuration.

3. A computer keyboard support of claim 1, further comprising:
   round paper holder connectors installed on the catch at equal intervals; and
   a guide bar installed at a bottom of the paper holder board and inserted into the round paper holder connectors.

4. A computer keyboard support of claim 1, wherein the main body is divided into separate parts, and by using an adjusting plate installed on the main body, the size of the main body can be adjusted.

5. A computer keyboard support of claim 1 wherein the main body has an L-configuration.

6. A computer keyboard support of claim 1, further comprising:
   a plurality of protrusions formed on end portions of the carriage, the paper holder board being inserted between the protrusions so that the paper holder board can freely turn.

7. A computer keyboard support of claim 1, further comprising:
   a catch bar inserted in a middle portion of the carriage and contacting an end portion of the catch through the guide of the catch so that movement of the carriage to the left or right is restricted.

8. A computer keyboard support of claim 1, wherein the catch has a predetermined configuration.

9. A computer keyboard support of claim 1, wherein the main body includes front and back adjusting plates for varying the size of the main body.

10. A computer keyboard support of claim 9, further comprising:
    a pair of paper holders being movable to the left or right and formed in front of the paper holder board.

11. A computer keyboard support of claim 1, wherein the paper holder board is equipped with a protruding paper seat installed at a bottom of the paper holder board.

12. A computer keyboard support of claim 11, wherein the carriage includes a guide groove extending along with the guide of the catch.

13. A computer keyboard support of claim 12, wherein the catch further includes side guides cooperating with the guide groove of the carriage.

14. A computer keyboard support, comprising:
    protruding type brackets installed on both sides at the back of a keyboard;
    a paper holder board assembled to the brackets by using shaft pins to enable the paper holder board to freely turn; and
    a paper board support of a specific height installed at the back of the brackets.

15. A computer keyboard support of claim 14, further comprising:
    a main body equipped with a back catch on which the protruding type brackets are installed.

16. A computer keyboard support of claim 15, wherein the main body further includes a front catch for fixing the keyboard thereby.

17. A computer keyboard support of claim 14, wherein the main body includes a plurality of assembling holes formed at certain intervals and a plurality of assembling bars cooperating with the assembling holes so that a size of the main body can be varied.

18. A computer keyboard support of claim 14, further comprising:
    a paper holder installed in front of the paper holder board and assembled with the protruding type brackets.

19. A computer keyboard support of claim 18, further comprising:
    a cross bar formed horizontally on the paper holder board.

20. A computer keyboard support of claim 19, wherein the paper holder includes an elongated hole and an adjuster both cooperating with the cross bar to control the position of the paper holder board.

* * * * *